US009672743B2

(12) United States Patent
Hamada et al.

(10) Patent No.: US 9,672,743 B2
(45) Date of Patent: Jun. 6, 2017

(54) VEHICLE TRAFFIC CONTROL SYSTEM (71) Applicant: HITACHI CONSTRUCTION MACHINERY CO., LTD., Tokyo (JP)

(72) Inventors: Tomoyuki Hamada, Tsuchiura (JP); Kazuhiro Sugawara, Ishioka (JP); Katsuaki Tanaka, Hitachinaka (JP); Masaki Kanai, Hitachinaka (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 414 days.

(21) Appl. No.: 14/364,270

(22) PCT Filed: Sep. 11, 2013

(86) PCT No.: PCT/JP2013/074564
§ 371 (c)(1),
(2) Date: Jun. 10, 2014

(87) PCT Pub. No.: WO2015/037084
PCT Pub. Date: Mar. 19, 2015

(65) Prior Publication Data
US 2015/0221222 A1 Aug. 6, 2015

(51) Int. Cl.
G08G 1/16 (2006.01)
G05D 1/02 (2006.01)

(52) U.S. Cl.
CPC .......... G08G 1/164 (2013.01); G05D 1/0297 (2013.01); G08G 1/166 (2013.01); G05D 2201/021 (2013.01)

(58) Field of Classification Search
CPC ........ G08G 1/164; G08G 1/166; G08G 1/127; G05D 1/0297; G05D 2201/021
See application file for complete search history.

(56) References Cited

U.S. PATENT DOCUMENTS 5,897,595 A 4/1999 Hawkins et al.
6,246,932 B1 6/2001 Kageyama et al.
(Continued)

FOREIGN PATENT DOCUMENTS

JP 60-163763 A 8/1985
JP 10-187239 A 7/1998
(Continued)

OTHER PUBLICATIONS

International Preliminary Report on Patentability received in corresponding International Application No. PCT/JP2013/074564 dated Mar. 24, 2016.

Primary Examiner — Michael J Zanelli
(74) Attorney, Agent, or Firm — Mattingly & Malur, PC (57) ABSTRACT A traffic control system for allowing vehicles to travel unattended while maintaining their inter-vehicular distances without interfering with each other includes an onboard control apparatus mounted on the vehicles; and a traffic control apparatus which divides tracks for multiple vehicles into a plurality of sections and performs a blocking control to assign non-overlapping travelable sections to the multiple vehicles as a permitted travel section. The onboard control apparatus sets a travel permission request starting distance that is longer than a stoppable distance on the basis of the current speed of the vehicle and repeatedly transmits a travel permission request and current position information to the traffic control apparatus until the next travel permission is obtained when the remaining length of the permitted travel section has become shorter than the travel permission request starting distance in the advancing direction of the vehicle.

4 Claims, 8 Drawing Sheets (56) References Cited

U.S. PATENT DOCUMENTS

| | | | |
|---|---|---|---|
| 6,799,100 B2 * | 9/2004 | Burns | G08G 1/207 340/436 |
| 7,742,853 B2 * | 6/2010 | Mori | G01C 21/005 701/117 |
| 9,336,684 B2 * | 5/2016 | Harasaki | G05D 1/0289 |
| 2007/0016366 A1 * | 1/2007 | Nagasawa | G05D 1/0212 701/413 |
| 2011/0118900 A1 | 5/2011 | Uchida et al. | |
| 2012/0330540 A1 * | 12/2012 | Ozaki | G06Q 10/047 701/117 |

FOREIGN PATENT DOCUMENTS

| | | |
|---|---|---|
| JP | 11-143536 A | 5/1999 |
| JP | 3424834 B2 | 5/2003 |
| JP | 2005-284779 A | 10/2005 |
| JP | 2011-107793 A | 6/2011 |
| JP | 2012-160106 A | 8/2012 |
| WO | 98/37468 A1 | 8/1998 |
| WO | 2012/105451 A1 | 8/2012 |

\* cited by examiner

PERMISSION REQUEST STARTING DISTANCE

VEHICLE TRAFFIC CONTROL SYSTEM

TECHNICAL FIELD

The present invention relates to a vehicle traffic control system.

BACKGROUND ART

There is conventionally a system where a plurality of vehicles such as dump trucks transporting mineral ore excavated from strip mines are controlled to operate unattended in a manner preventing interference between the vehicles. Specifically, a control station for monitoring the movement of multiple vehicles is provided along with radio communication means for allowing communication between the control station and each of the multiple vehicles, the vehicles exchanging information with the control station for control purposes.

For example, there has been proposed a vehicle monitoring apparatus whereby the current position of each of the vehicles involved is transmitted to the control station at predetermined time intervals or at intervals of a predetermined distance traveled. Given the vehicle positions and the relation therebetween, the control station transmits to the vehicles instructions to continue traveling, to decelerate, to stop, etc., so that the vehicle will not interfere with one another. Vehicles located close to each other exchange their position information by means of radio communication to avoid mutual interference (e.g., see Patent Literature 1).

Also proposed are a system and a method for managing resources having a plurality of entry points. There are regions surrounding the intersections of transport roads and the work areas for loading, soil dumping, or other works. The vehicles approaching the regions notify the control station of their approach. Given the notifications, the control station determines which of the vehicles should be given priority, and issues an instruction such that the vehicle with priority should be allowed to enter the regions while the rest of the vehicles are waiting in line, whereby interference between the vehicles is avoided (e.g., see Patent Literature 2).

PRIOR ART LITERATURE

Patent Literature

[Patent Literature 1]
JP-3424834-B
[Patent Literature 2]
U.S. Pat. No. 5,897,595

SUMMARY OF THE INVENTION

Problem to be Solved by the Invention

According to the technique described in the above Patent Literature 1, when there occurs a failure of radio communication causing the transmission of vehicle position information to malfunction, it may be impossible to grasp the positional relations between the vehicles, which can lead to near collision of vehicles. This raises the need for stopping the vehicles. In case a vehicle stops in a region where radio communication is failing, it will be hard for the vehicle to restore to normalcy.

Also, according to the technique described in the above Patent Literature 2, there may occur a failure of radio communication making it difficult for the vehicles to give notification that they are approaching particular areas. This leads to the necessity of stopping the vehicles to prevent their near collision. In addition, the same difficulty as with the technique of the above-cited Patent Literature 1 will be experienced if a radio communication fails in a particular region.

The present invention has been devised in view of the above circumstances, and an object of it is to provide a traffic control system for vehicles operating unattended, whereby inter-vehicular distance is maintained in a manner avoiding interference between the vehicles even when the communication by radio or other means between the control station and the vehicles is uncertain.

Means for Solving the Problem

In order to solve the above object, the present invention is, in a first aspect, a vehicle traffic control system including: an onboard control apparatus mounted on each of a plurality of vehicles; a traffic control apparatus which divides tracks for the multiple vehicles into a plurality of sections and which performs a blocking control to assign non-overlapping travelable sections to the multiple vehicles as a permitted travel section each; and communication means for allowing communication between the traffic control apparatus and the onboard control apparatus. Each of the onboard control apparatus sets a travel permission request starting distance as a distance longer than a stoppable distance on a basis of the current speed of the own vehicle. Each onboard control apparatus transmits repeatedly a travel permission request and current position information on the own vehicle to the traffic control apparatus until the next travel permission is obtained when the remaining length of the permitted travel section has become shorter than the travel permission request starting distance in the advancing direction of the own vehicle.

A second aspect of the invention is the vehicle traffic control system of the first aspect, wherein the traffic control apparatus that receives the current travel information on the own vehicle and the travel permission request transmitted from the onboard control apparatus, and that calculates the next permitted travel section assigned to the onboard control apparatus.

A third aspect of the invention is the vehicle traffic control system of the second aspect, wherein the onboard control apparatus that sets the travel permission request starting distance as at least a sum of the stoppable distance of the own vehicle and an error in determining a self-position of the own vehicle, and further sets travel permission cancellation distance at least longer than the error in determining a self-position of the own vehicle. The traffic control apparatus further cancels travel permission for the permitted travel section when the distance from the end of the permitted travel section passed by the own vehicle to the current position of the own vehicle has become longer than the travel permission cancellation distance.

A fourth aspect of the invention is the vehicle traffic control system of the second or third aspect, wherein the traffic control apparatus that sets a track section as the permitted travel section to be granted to the own vehicle if there is a track section merging with the permitted travel section granted to the own vehicle. The traffic control apparatus further sets another track section as the permitted travel section to be granted to the own vehicle if there is another track section intersecting with the permitted travel section granted to the own vehicle.

A fifth aspect of the invention is the vehicle traffic control system of any one of the first to fourth aspects, wherein the traffic control apparatus including: measurement means which measures communication condition between the traffic control apparatus and the control apparatuses; recording means which records the communication condition measured by use of the measurement means to map data in the traffic control apparatus; and adjustment means which adjusts the permitted travel sections for the vehicles by use of the information on the communication condition recorded to the map data.

Effect of the Invention

According to the present invention, a vehicle updates the permitted travel section just by means of communicating with the control station at a time when the vehicle approaches the end of a permitted section. This decreases the frequency of each vehicle communicating with the control station, thereby reducing the frequency of vehicle stoppage due to communication troubles. As a result, the vehicles are allowed to travel nonstop with inter-vehicular distances maintained to avoid interference therebetween.

MODE FOR CARRYING OUT THE INVENTION

Figure 1:
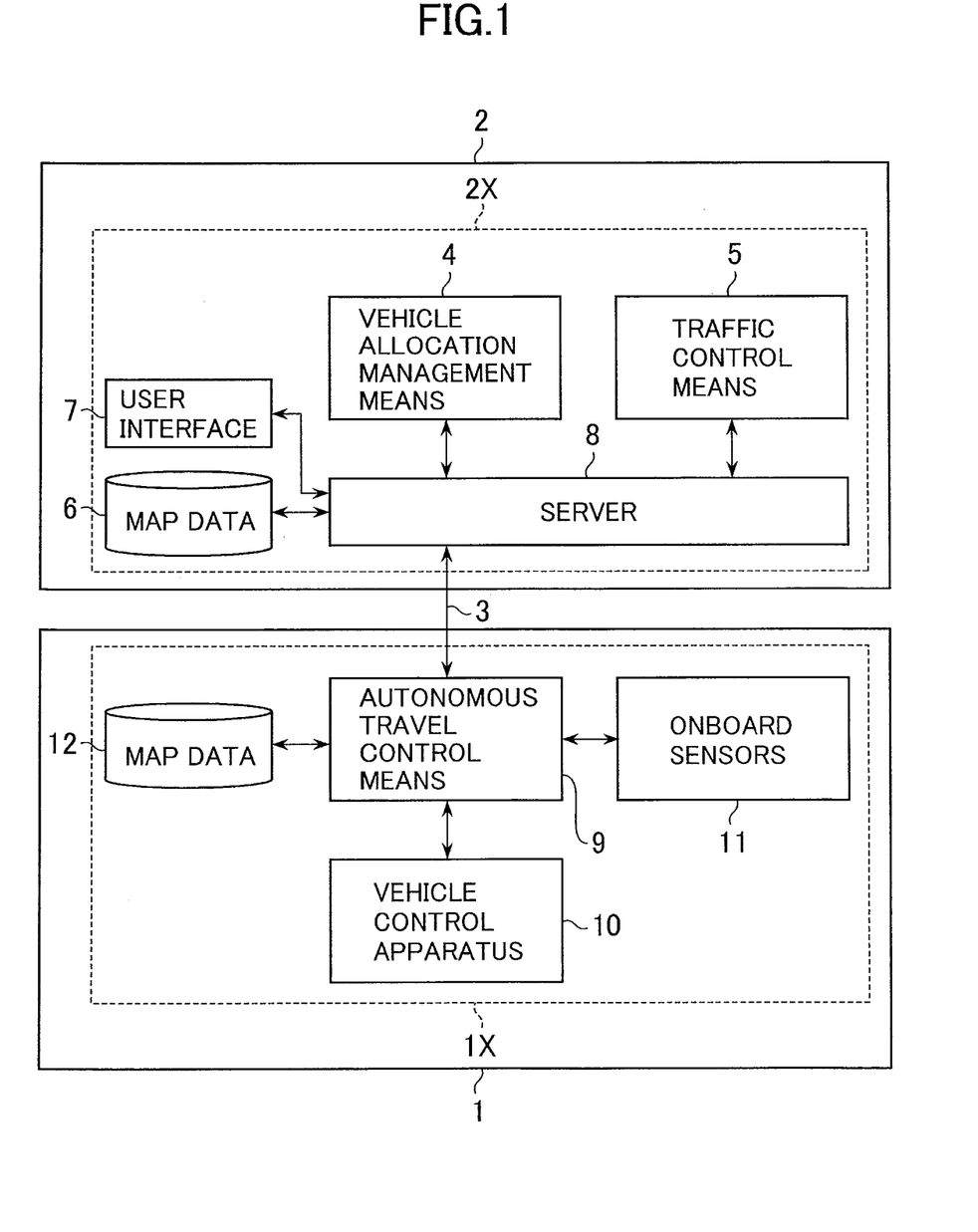
FIG. 1 is a configuration drawing showing the configuration of a vehicle traffic control system as one embodiment of the present invention.

One embodiment of the present invention will be explained below by reference to the accompanying drawings with dump trucks traveling unattended for use at mines taken as an example. FIG. 1 is a configuration drawing showing the configuration of a vehicle traffic control system as one embodiment of the present invention.

In FIG. 1, reference numeral 1 stands for a dump truck corresponding to a vehicle, 2 for a control station, and 3 for radio communication means for allowing information exchange between the dump trucks and the control station. Although there exist a plurality of dump trucks 1 each communicating with the control station 2, they are structurally the same, and only one dump truck 1 is shown. The vehicle traffic control system as one embodiment of the present invention includes a traffic control apparatus 2X installed in the control station 2 and an onboard control apparatus 1X mounted on board the truck 1.

The traffic control apparatus 2X installed in the control station 2 includes: vehicle dispatch management means 4 for determining the destination of the dump truck 1 and the route leading thereto; traffic control means 5 for performing control so that the dump trucks 1 will not interfere with each other; map data 6 storing information on the tracks on which the dump truck 1 travels at the site of a mine; a user interface 7 which displays status of the dump truck 1 and through which manual instructions are input to the dump truck 1; and a server 8 for allowing communication between these components and providing radio communication with the onboard control apparatus 1X on the dump truck 1.

The vehicle dispatch management means 4 and traffic control means 5 may be constituted as software for use on a computer or others provided in a monitoring office at the site of the mine, and the map data 6 may be structured as data stored in the computer. The user interface 7 may be constituted as a display device or an input device for the computer, and the server 8 may be structured as a device for permitting communication between these components.

The onboard control apparatus 1X mounted on the dump truck 1 includes: autonomous travel control means 9 for determining the action of the dump truck 1 in accordance with instructions from the control station 2 or with information from sensors; a vehicle control apparatus 10 for controlling the acceleration, deceleration, and steering of the dump truck 1 upon receiving instructions from the autonomous travel control means 9; and map data 12 storing information on the tracks on which the dump truck 1 travels at the site of the mine.

The autonomous travel control means 9 may be constituted as software for use on a computer or a microprocessor mounted on the dump truck 1, and the map data 12 may be structured as data stored in that computer or microprocessor.

Figure 2:
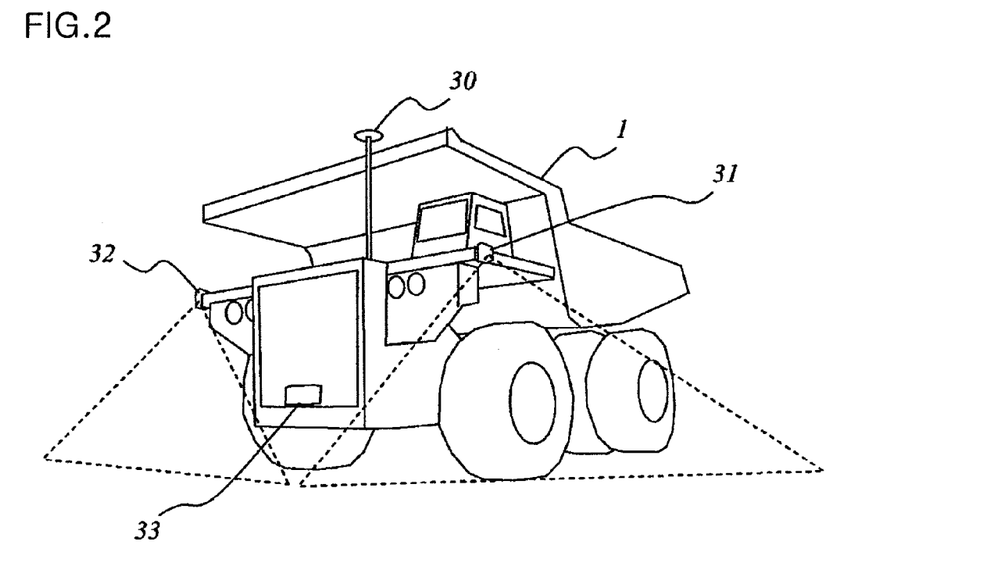
FIG. 2 is a perspective view of a dump truck as a vehicle constituting part of the vehicle traffic control system as one embodiment of the present invention.

The dump truck 1 is Explained now by use of FIG. 2. FIG. 2 is a perspective view of the dump truck as a vehicle constituting part of the vehicle traffic control system as one embodiment of the present invention.

In FIG. 2, the dump truck 1 is equipped with: a GPS antenna 30 for receiving signals from GPS (Global Positioning System) satellites in order to identify the self-position of the dump truck; laser radar sensors 31, 32 for detecting the shoulder positions of the road on which the dump truck 1 travels; and a millimeter-wave radar sensor 33 for detecting obstructions ahead of the traveling dump truck 1.

The means for identifying the self-position of the dump truck 1 is not necessarily required to be GPS satellites. Alternatively, a system may be adopted whereby radio waves from base stations on the ground are used to identify the position. In this case, the antenna 30 is not for GPS usage; it picks up radio waves from the base stations.

The means for detecting the shoulder positions of the road are not necessarily required to be the laser radar sensors 31, 32. Alternatively, cameras may be used to detect the shoulder positions through image processing. In this case, the radar sensors 31, 32 are replaced with cameras overlooking the vehicle sides. Furthermore, the means for detecting the obstructions ahead is not necessarily required to be the millimeter-wave radar sensor 33. Alternatively, a stereo camera may be used for the detection. In this case, the radar sensor 33 is replaced with a plurality of stereo cameras facing ahead. The stereo camera may be mounted higher than the position shown in FIG. 2 in an overlooking manner.

Figure 3:
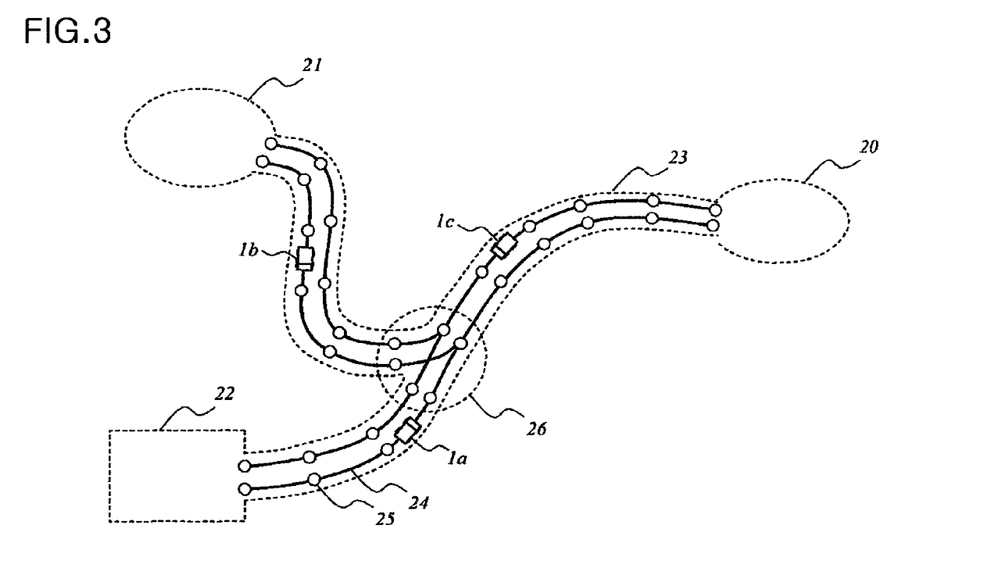
FIG. 3 is a conceptual diagram showing a typical transport road at the site of a mine to which the vehicle traffic control system as one embodiment of the present invention is applied.

Explained now with the use of FIG. 3 is the transport road on which the dump truck 1 travels at the site of a strip mine. FIG. 3 is a conceptual diagram showing a typical transport road at the site of the mine to which the vehicle traffic control system as one embodiment of the present invention is applied.

In FIG. 3, the site of the strip mine includes: an excavation site 20 from which surface soil and ores are excavated by shovels or other equipment and loaded onto dump trucks 1a, 1b, 1c; a soil dumping site 21 at which the surface soil brought from the excavation site 20 is dumped and laid out in layers or in a radial pattern; the other soil dumping site 22 at which crushers and other machines are set up to crush the ores brought from the excavation site 20 and from which the crushed ores are transported by a conveyor belt or like means to processing equipment or to a loading pit for loading onto freight cars, for example; and a transport road 23 on which the dump trucks 1a, 1b, 1c travel to transport their loads to the soil dumping site 21 or 22.

Tracks 24 are established on the transport road 23. The dump trucks 1a, 1b, 1c travel along the tracks 24. The tracks 24 are provided as an up-lane and a down-lane on the transport road 23, for example. The traffic over the tracks is managed according to the keep-to-the-right rule, for example, as in the way of open roads.

When surface soil is excavated at the excavation site 20, the dump truck 1a as an example shuttles between the excavation site 20 and one soil dumping site 21; and when ores are excavated, the dump truck 1a shuttles between the excavation site 20 and the other soil dumping site 22. This might result in a plurality of dump trucks 1a, 1b, 1c interfering with each other at an intersection 26 at the time when each of them is transporting different loads, for example. Also, the dump trucks may interfere with one another due to the difference in their traveling speed even if traveling in the same direction on the same track.

There will be more excavation sites 20 and soil dumping sites 21, 22, with more transport roads 23 connecting these sites and intersecting each other in a complicated fashion at the actual site of mine. This raises the possibility of dump trucks interfering with one another. Hence, there comes the need for the control station 2 controlling these dump trucks 1a, 1b, 1c not to interfere with each other.

The tracks 24 are given as coordinate values set on a map. The dump trucks 1a, 1b, 1c are controlled to accelerate, decelerate, and steer through comparisons of their self-positions identified by GPS with the coordinate values of the tracks 24, so that the dump trucks travel unattended along the tracks 24. Also, nodes 25 are provided on the tracks 24 to demarcate the boundaries of the sections thereon. The information on the tracks 24 and nodes 25 is the same both in the map data 6 stored in the traffic control apparatus 2X of the control station and in the map data 12 held in the onboard control apparatus 1X on the dump trucks 1a, 1b, 1c. In this context one section refers to an interval between at least two nodes 25 but is not limited in length.

The traffic control apparatus 2X of the control station 2 grants and cancels permission to travel each section defined as the interval between the nodes 25, and notifies the onboard control apparatus 1X on the dump trucks 1a, 1b, 1c of information on such grant and cancellation for travel control, whereby interference between the dump trucks is avoided.

Figure 4A:
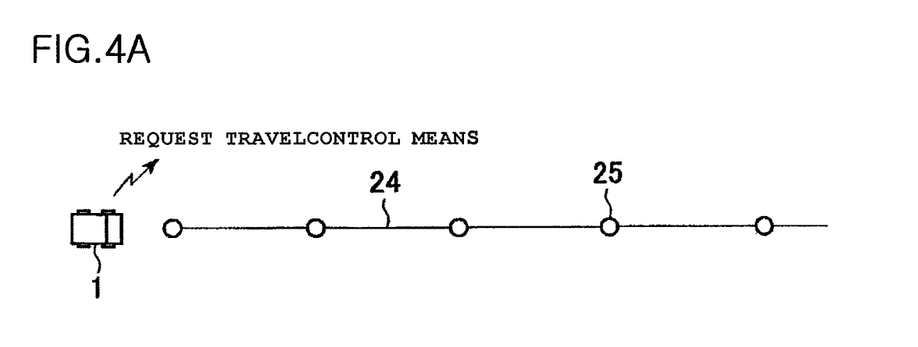
FIG. 4A is a conceptual diagram explaining a basic operation of the vehicle traffic control system as one embodiment of the present invention, where an onboard control apparatus 1X on a dump truck 1 requests a destination from a traffic control apparatus 2X of a control station 2.
Figure 4B:
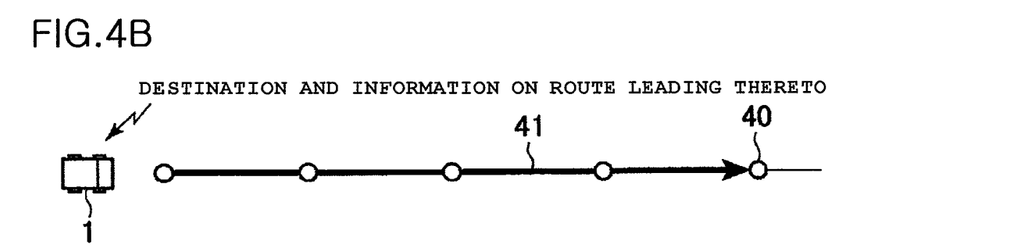
FIG. 4B is a conceptual diagram explaining another basic operation of the vehicle traffic control system as one embodiment of the present invention, where the traffic control apparatus 2X of the control station 2 transmits a destination and a route to the onboard control apparatus 1X on the dump truck 1.
Figure 4C:
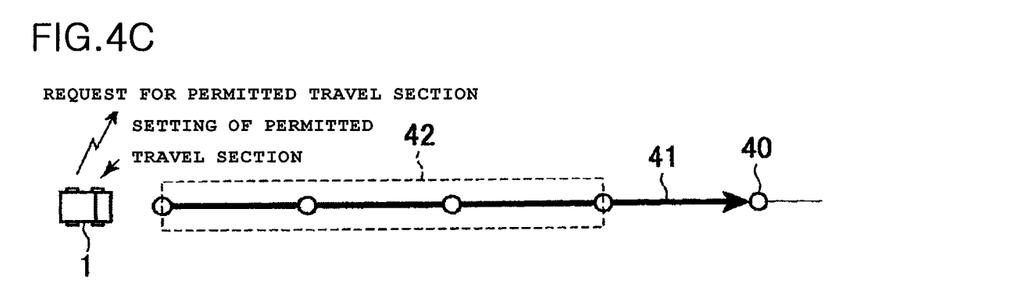
FIG. 4C is a conceptual diagram explaining another basic operation of the vehicle traffic control system as one embodiment of the present invention, where the traffic control apparatus 2X of the control station 2 sets a travel permission section and transmits the setting to the onboard control apparatus 1X on the dump truck 1.

Some basic operations of the traffic control system embodying the present invention are now explained with the use of FIGS. 4A through 4C. FIG. 4A is a conceptual diagram explaining a basic operation of the vehicle traffic control system as one embodiment of the present invention, where the onboard control apparatus 1X on the dump truck 1 requests a destination from the traffic control apparatus 2X of the control station 2. FIG. 4B is a conceptual diagram explaining another basic operation of the vehicle traffic control system as one embodiment of the present invention, where the traffic control apparatus 2X of the control station 2 transmits a destination and a route to the onboard control apparatus 1X on the dump truck 1. FIG. 4C is a conceptual diagram explaining another basic operation of the vehicle traffic control system as one embodiment of the present invention, where the traffic control apparatus 2X of the control station 2 sets a travel permission section and transmits the setting to the onboard control apparatus 1X on the dump truck 1. Throughout FIGS. 4A through 4C, the same reference numerals as those in FIGS. 1 through 3 designate the same entities, and their detailed explanations are omitted.

FIGS. 4A to 4C depict communications between the onboard control apparatus 1X on the dump truck 1 and the traffic control apparatus 2X of the control station 2, and settings of the tracks 24 and travel permission section 42.

Referring first to FIG. 4A, the onboard control apparatus 1X on the dump truck 1 transmits a message requesting a destination to the traffic control apparatus 2X of the control station 2. This message is transmitted after the dump truck 1 shown in FIG. 3 has been loaded with surface soil or ores at the excavation site 20 or has dumped the load at the soil dumping site 21 or 22. Specifically, the autonomous travel control means 9, installed in the onboard control apparatus 1X on the dump truck 1 shown in FIG. 1, sends the message through the radio communication means 3 at a time of assessment on the current status of the dump truck 1. The message is then received by the server 8 in the traffic control apparatus 2X of the control station 2 and forwarded to the vehicle dispatch management means 4.

In FIG. 1, the vehicle dispatch management means 4 in the traffic control apparatus 2X determines the destination for the dump truck 1 that has requested it and the route leading thereto in consideration of the status of other dump trucks 1 and instructs the server 8 to transmit the destination and route to the onboard control apparatus 1X on the dump truck 1. The server 8 transmits the destination 40 and the route 41 leading thereto to the onboard control apparatus 1X on the dump truck 1 by way of the radio communication means 3. FIG. 4B depicts an example of the route 41 and destination 40 thus transmitted.

Next, the onboard control apparatus 1X on the dump truck 1 transmits a message requesting a travel permission section to the traffic control apparatus 2X of the control station 2 through processing by the autonomous travel control means 9 shown in FIG. 1. This message is received by the server 8 in the traffic control apparatus 2X of the control station 2 and forwarded to the traffic control means 5. The traffic control means 5 sets the travel permission section 42 on the basis of a process, of which the details are explained later, and transmits the setting to the onboard control apparatus 1X on the dump truck 1 by way of the server 8. FIG. 4C depicts an example of the travel permission section 42, route 41, and destination 40 thus transmitted. The dump truck 1 is not allowed to start traveling until having received the travel permission section 42.

In this embodiment, the traffic control apparatus 2X of the control station 2 manages which section of the tracks 24 is assigned to which dump truck 1 to travel by means of such information being recorded to the map data 6. The traffic control means 5, while referencing that information, sets the travel permission section 42 in response to a travel permission request from a dump truck 1. On the side of the dump trucks 1, meanwhile, the travel permission section 42 received by the dump truck 1 from the traffic control apparatus 2X of the control station 2 is recorded to the map data 12 in the onboard control apparatus 1X on the dump truck 1, so that the extent to which the dump truck 1 in question can travel is determined accordingly.

The status of travel permission settings may not be recorded to the map data 6 or 12. The records on the side of the control station 2 may be held in the traffic control means 5 of the traffic control apparatus 2X; those on the side of the dump truck 1 may be held in the autonomous travel control means 9 of the onboard control apparatus 1X, as long as the records are arranged to match an ID of the sections on the tracks 24.

Figure 5A:
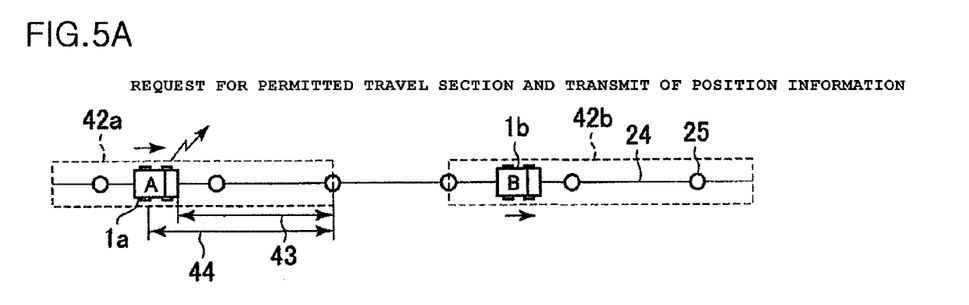
FIG. 5A is a conceptual diagram explaining an operation of traffic control means constituting part of the vehicle traffic control system as one embodiment of the present invention, where the onboard control apparatus 1X on the dump truck 1 transmits a travel permission section request and position information to the traffic control apparatus 2X of the control station 2.
Figure 5B:
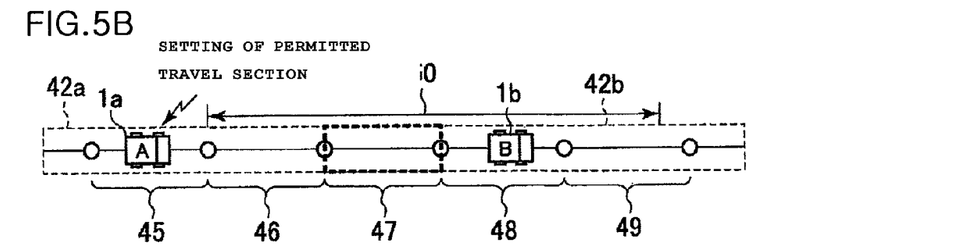
FIG. 5B is a conceptual diagram explaining another operation of the traffic control means constituting part of the vehicle traffic control system as one embodiment of the present invention, where the traffic control apparatus 2X of the control station 2 transmits a travel permission section setting to the onboard control apparatus 1X on the dump truck 1.
Figure 5C:
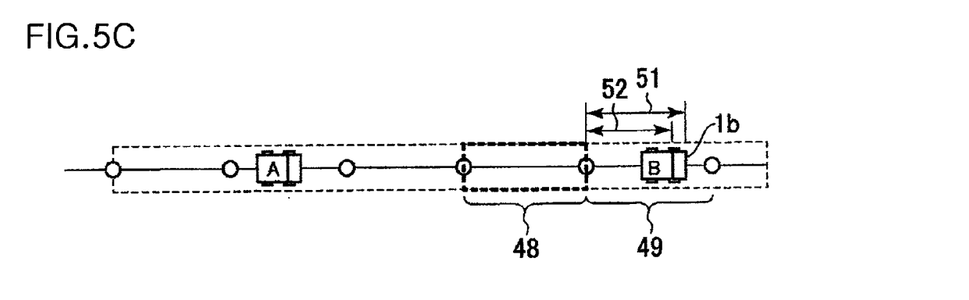
FIG. 5C is a conceptual diagram explaining another operation of the traffic control means constituting part of the vehicle traffic control system as one embodiment of the present invention, where the traffic control apparatus 2X of the control station 2 cancels the travel permission section and transmits the cancellation to the onboard control apparatus 1X on the dump truck 1.

How to set travel permission sections with this embodiment is explained below in detail with the use of FIGS. 5A to 5C. FIG. 5A is a conceptual diagram explaining an operation of the traffic control means constituting part of the vehicle traffic control system as one embodiment of the present invention, where the onboard control apparatus 1X on the dump truck 1 transmits a travel permission section request and position information to the traffic control apparatus 2X of the control station 2. FIG. 5B is a conceptual diagram explaining another operation of the traffic control means constituting part of the vehicle traffic control system as one embodiment of the present invention, where the traffic control apparatus 2X of the control station 2 transmits a travel permission section setting to the onboard control apparatus 1X on the dump truck 1. FIG. 5C is a conceptual diagram explaining another operation of the traffic control means constituting part of the vehicle traffic control system as one embodiment of the present invention, where the traffic control apparatus 2X of the control station 2 cancels the travel permission section and transmits the cancellation to the onboard control apparatus 1X on the dump truck 1. Throughout FIGS. 5A to 5C, the same reference numerals as those in FIGS. 1 to 4C designate the same entities, and their detailed explanations are omitted.

FIGS. 5A through 5C depict communications between the onboard control apparatus 1X on the dump trucks 1a, 1b and the traffic control apparatus 2X of the control station 2, and settings of the tracks 24 and travel permission sections 42a, 42b.

In FIG. 5A through 5C, reference numerals 1a, 1b stand for the dump trucks traveling in the respective arrowed directions; and 42a, 42b for the travel permission sections granted to the dump trucks 1a, 1b, respectively. Reference numeral 43 denotes a remaining permitted travel distance indicative of the distance traveled along the tracks 24 from the current position of the dump truck 1a to the end of the travel permission section 42a. Reference numeral 44 represents a travel permission request starting distance.

The travel permission request starting distance 44 is a distance longer than that within which the dump trucks 1a, 1b can stop. For example, the travel permission request starting distance 44 may be defined by the following expression in which a predetermined offset distance Loff is added to a stoppable distance Lst:

$$44 = Lst + Loff$$

The stoppable distance Lst is defined by the following expression:

$$Lst = mv^2 / 2f$$

where m stands for the mass including the loads of the dump trucks 1a, 1b; v denotes the current speed of the dump trucks 1a, 1b; and f represents the braking force of the dump trucks 1a, 1b. The offset distance Loff is a value that is set in consideration of the time required to perform radio communication and the incidence of failures in radio communication, for example. The current speed of the dump trucks 1a, 1b may be determined from measurements of their wheel revolutions, or may be established with the use of a maximum permissible speed set for the dump trucks 1a, 1b relative to their current traveling positions in the map data 12.

The travel permission request starting distance 44 may be determined on the side of the onboard control apparatus 1X on the dump trucks 1a, 1b operating as vehicles, or may be established on the side of the traffic control apparatus 2X of the control station 2. In view of possible communication disruptions, the travel permission request starting distance 44 should preferably be determined by the onboard control apparatus 1X on the vehicle side.

With reference to FIG. 5A, when the remaining permitted travel distance 43 has become shorter than the travel permission request starting distance 44 during travel in the travel permission section 42a, the onboard control apparatus 1X on the dump truck 1a transmits a message requesting travel permission to the traffic control apparatus 2X of the control station 2. This message includes information on the current position of the dump truck 1a.

Upon receiving the travel permission request from the onboard control apparatus 1X on the dump truck 1a, the traffic control apparatus 2X of the control station 2 uses the information to identify the section in which the dump truck 1a is traveling. The traffic control apparatus 2X proceeds to give the dump truck 1a permission to travel a section which extends in the advancing direction of the dump truck 1a and which is longer than a predetermined permitted length of travel from the end of the section where the dump truck is currently traveling. The dump truck in question is granted permission to travel up to that section if there is a section that another vehicle is permitted to travel.

What follows is a detailed explanation with reference to FIG. 5B. In FIGS. 5A through 5C, reference numeral 45 stands for the section in which the dump truck 1a travels, and reference numeral 48 denotes the section in which the dump truck 1b travels. In this case, sections 46 and 47 exist between the dump trucks 1a and 1b, and a section 49 is ahead of the dump truck 1b. In FIG. 5B, the onboard control apparatus 1X on the dump truck 1a is supposed to be granted permission to travel the sections 46 through 49 that are longer than a permitted length of travel 50.

However, the sections 48 and 49 are eliminated because the dump truck 1b has already been given permission to travel these sections, and permission to travel the sections 46 and 47 is granted. Since the permission to travel the section 46 has already been granted, the onboard control apparatus 1X on the dump truck 1a is given the section 47 as a new travel permission section.

The travel permission section is canceled when, following passage through that section by the dump trucks 1a, 1b, the distance between the positions of these trucks and the end of the section in question has become longer than the travel permission cancellation distance.

What follows is a detailed explanation with reference to FIG. 5C. In FIG. 5C, the dump truck 1b has moved into the section 49 from the section 48 at the time of FIG. 5B. Reference numeral 51 denotes the distance between the dump truck 1b and the end of the section, and reference numeral 52 represents the predetermined travel permission cancellation distance. The section 48 in which the onboard control apparatus 1X on the dump truck 1b is given permission to travel is canceled when the distance 51 between the dump truck 1b and the end of the section has become longer than the travel permission cancellation distance 52. As a result, the section in question can be allocated to the onboard control apparatus 1X on the subsequent dump truck 1a.

Figure 6:
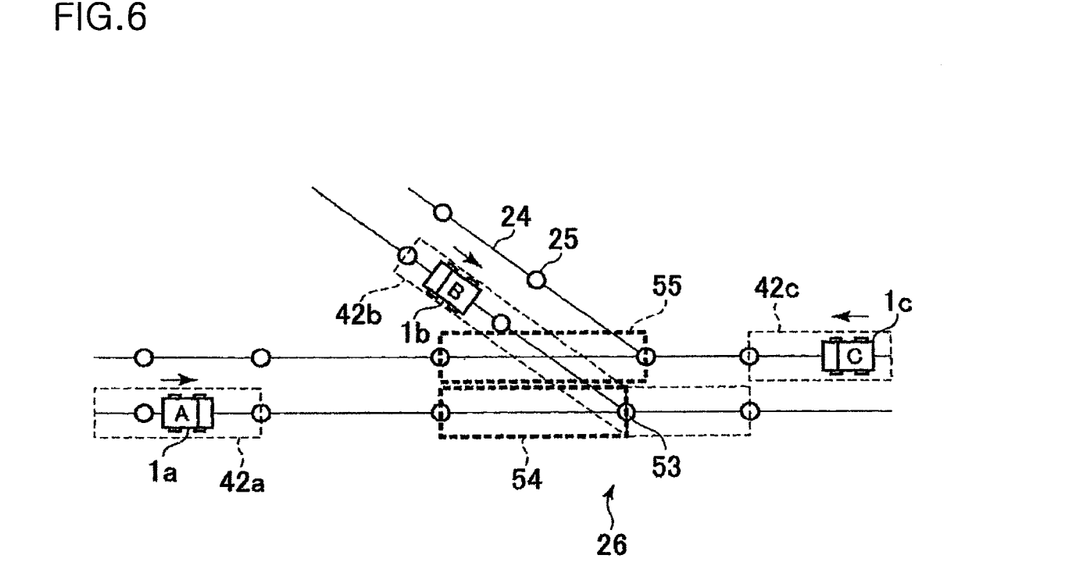
FIG. 6 is a conceptual diagram explaining typical settings of travel permission sections at an intersection by the vehicle traffic control system as one embodiment of the present invention.
Figure 7:
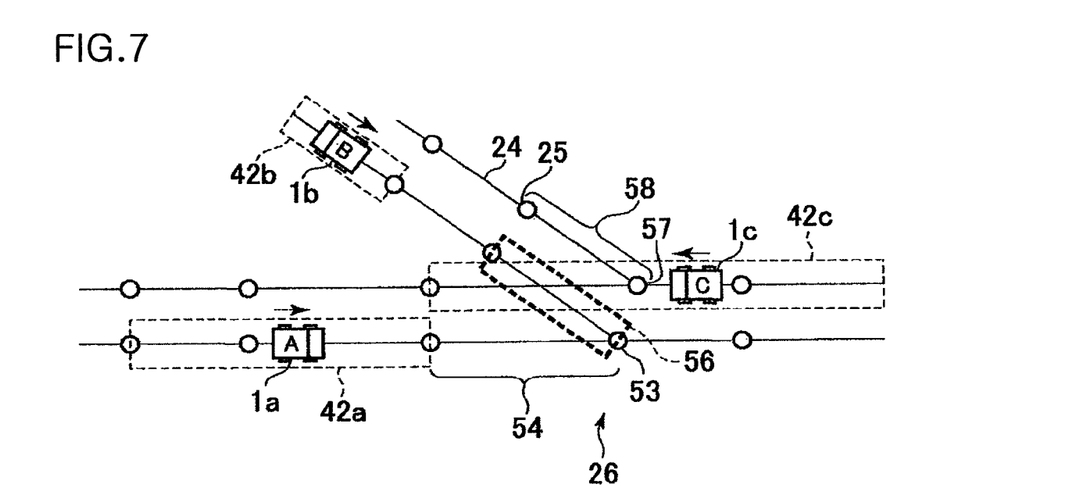
FIG. 7 is a conceptual diagram explaining other typical settings of travel permission sections at the intersection by the vehicle traffic control system as one embodiment of the present invention.

Explained now with the use of FIGS. 6 and 7 are detailed settings of travel permission sections at an intersection with this embodiment. FIG. 6 is a conceptual diagram explaining typical settings of travel permission sections at the intersection by the vehicle traffic control system as one embodiment of the present invention, and FIG. 7 is a conceptual diagram explaining other typical settings of travel permission sections at the intersection by the vehicle traffic control system as one embodiment of the present invention. In FIGS. 6 and 7, the same reference numerals as those in FIGS. 1 through 5C designate the same entities, and their detailed explanations are omitted.

FIG. 6 shows settings regarding: the onboard control apparatus 1X on the dump trucks 1a, 1b, 1c; the tracks 24; and the travel permission sections 42a, 42b, 42c. The tracks 24 of the dump truck 1b merge with those of the dump truck 1a at a node 53 in a section 54 and intersect with those of the dump truck 1c in a section 55.

Where the travel permission section 42b is given to the onboard control apparatus 1X on the dump truck 1b and where there exist the tracks 24 merging with the tracks 24 in that travel permission section 42b, the merging tracks 24 are also assigned as a travel permission section to the dump truck 1b. In FIG. 6, the section 54 merges with the tracks of the dump truck 1b at the node 53, so that the dump truck 1b is also given permission to travel the section 54. In this manner, the onboard control apparatus 1X on the dump truck 1a is not given permission to travel the section 54 while the dump truck 1b is traveling the intersection 26. The dump truck 1a is, therefore, prevented from entering the intersection 26 and interfering with the dump truck 1b.

Where the travel permission section 42b is given to the onboard control apparatus 1X on the dump truck 1b and where there exist the tracks 24 intersecting with the tracks 24 in that travel permission section 42b, the section of the intersecting tracks 24 is also assigned as a travel permission section to the dump truck 1b. In FIG. 6, the section 55 intersects with the tracks 24 for the dump truck 1b, so that the dump truck 1b is also given permission to travel the section 55. In this manner, the onboard control apparatus 1X on the dump truck 1c is not given permission to travel the section 55 while the dump truck 1b is traveling the intersection 26. The dump truck 1c is, therefore, prevented from entering the intersection 26 and interfering with the dump truck 1b.

FIG. 7 shows settings regarding: the onboard control apparatus 1X on the dump trucks 1a, 1b, 1c; the tracks 24; and the travel permission sections 42a, 42b, 42c. The tracks 24 for the dump truck 1c branch at a node 57 in a section 58 and intersect with the tracks 24 for the dump truck 1b in a section 56.

Where the travel permission section 42c is given to the onboard control apparatus 1X on the dump truck 1c and where the section 56 has the tracks 24 intersecting with the tracks 24 in that travel permission section 42c, the section 56 having the intersecting tracks 24 is also assigned as a travel permission section to the dump truck 1c. However, since permission to travel the section 56 is given secondarily due to the presence of the intersection, permission to travel that section 54 will not be granted even if the section 54 has the tracks 24 merging at the node 53. In this manner, the dump truck 1a is able to travel the intersection 26 even while the dump truck 1c is passing the intersection 26. Also, permission to travel the section 58 is not granted because the section 58 has the tracks 24 connected with those of the dump truck 1c at the node 57 not in the merging direction but in the branching direction.

The above-mentioned travel permission sections 54, 55, 56 are set secondarily at the intersection 26 not to let the dump trucks 1a, 1b, 1c actually travel but to prevent other possibly interfering trucks from entering the intersection. These sections, although set in the map data 6 of the traffic control apparatus 2X on the side of the control station 2, need not be notified as travel permission sections to the onboard control apparatus 1X on the dump trucks 1a, 1b, 1c.

Explained now with the use of FIGS. 5A through 5C is how this embodiment deals with communication disruptions. Transport roads and other paths at the site of the mine are typically provided along the walls of a strip mine pit, and therefore, radio communication may be temporarily disrupted by the presence of the pit walls. Further, diverse radio signals including those from transceivers at the site of the mine are in the air. The radio interference due to them could conceivably cause temporary communication disruptions.

Referring to FIG. 5A, the onboard control apparatus 1X on the dump truck 1a transmits a message requesting permission to travel to the traffic control apparatus 2X of the control station 2 when the remaining permitted travel distance 43 in the onboard control apparatus 1X on the dump truck 1a has become shorter than the travel permission request starting distance 44. The remaining permitted travel distance 43 will remain shorter than the travel permission request starting distance 44 on a condition that the message has failed to reach the traffic control apparatus 2X of the control station 2 or a message giving permission to travel from the traffic control apparatus 2X of the control station 2 has not reached the onboard control apparatus 1X on the dump truck 1a due to a communication disruption or some other cause. The onboard control apparatus 1X on the dump truck 1a as a result will transmit repeatedly the message requesting permission to travel while traveling continuously.

The dump truck 1a could travel continuously without decelerating in the section whose travel is permitted if the message giving permission to travel has been obtained from the traffic control apparatus 2X of the control station 2 before the remaining permitted travel distance 43 becomes shorter than the stoppable distance Lst. After the remaining permitted travel distance 43 had been shorter than the stoppable distance Lst, if the message giving permission to travel has not been obtained from the traffic control apparatus 2X of the control station 2, the onboard control apparatus 1X on the dump truck 1a will start to decelerate so as to stop within the current travel permission section 42a. The onboard control apparatus 1X on the dump truck 1a also will transmit repeatedly the message requesting permission to travel during this time.

From the time the onboard control apparatus 1X on the dump truck 1a transmits a first message requesting permission to travel till the time the dump truck 1a comes to a stop, the dump truck 1a has traveled at least a distance equivalent to the travel permission request starting distance 44. During this time, the communication disruption caused by the pit walls surrounding the tracks and the radio interference due to other radio waves vary in degree. This raises the possibility of the next permission for travel to be obtained before the onboard control apparatus 1X on the dump truck 1a comes to a stop. The frequency of the dump truck 1a to stop can be therefore reduced even under the conditions of communication disruptions taking place.

It has been explained above that the travel permission request starting distance 44 is established by way of addition of the predetermined offset distance Loff to the stoppable distance Lst. Making the offset distance Loff longer will raise the probability of the next travel permission section to be obtained before the onboard control apparatus 1X on the dump truck 1a starts to decelerate. Therefore, with the length of the offset distance Loff adjusted in accordance with the frequency of radio communication disruptions, it is possible to increase the probability that the dump truck 1a will continuously travel without decelerating.

A plurality of dump trucks are under exclusive control not to be given travel permission to enter simultaneously the intersection 26 or like spots in this embodiment. There is no possibility of the dump trucks interfering with one another as long as they travel within the range where they are given permission to travel even if communication with a given dump truck is disrupted. The individual dump trucks will be allowed to travel continuously whenever they are given the next permission to travel while they are moving in the range where permission to travel is granted.

Figure 8:
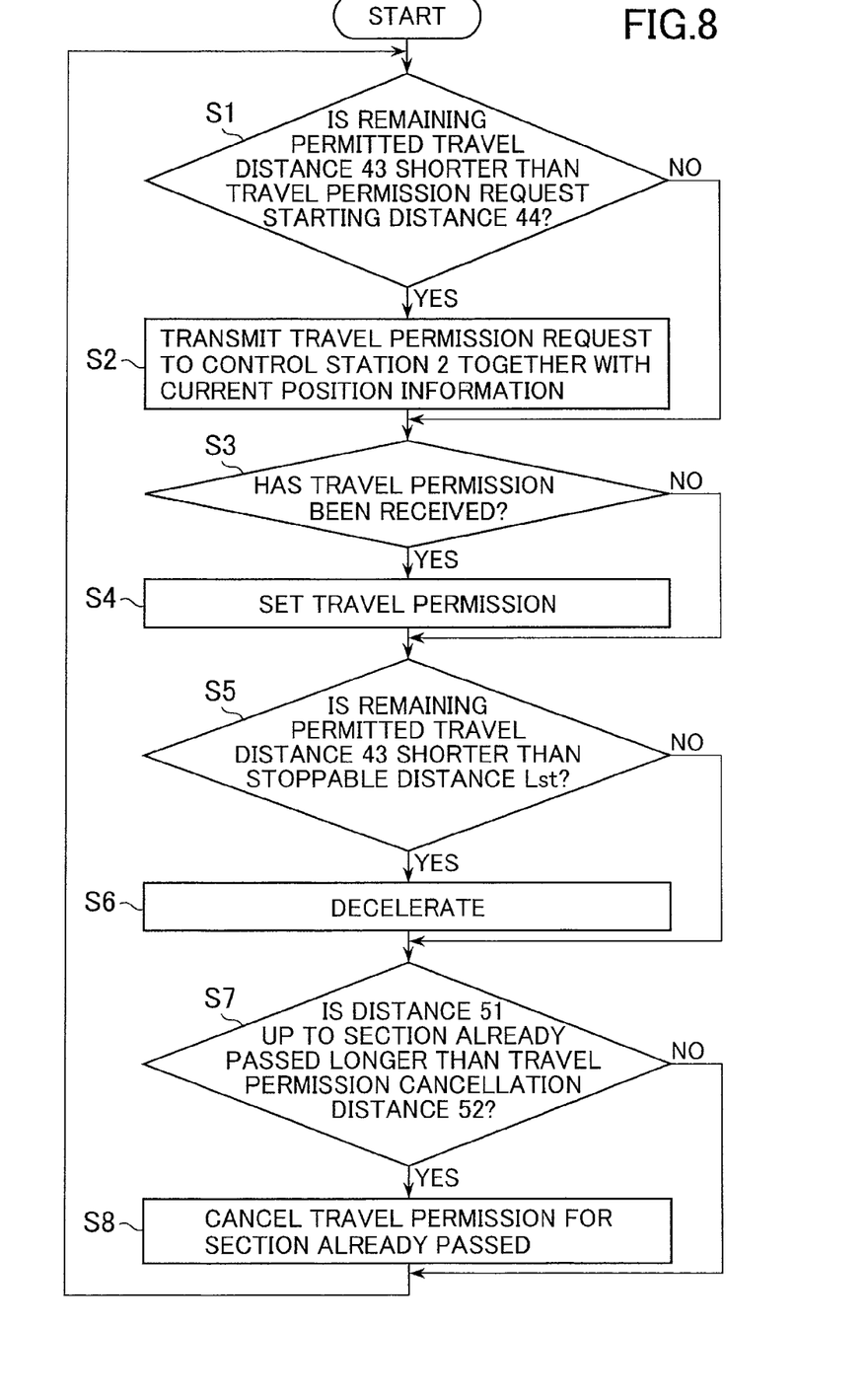
FIG. 8 is a flowchart showing details of a process performed by an autonomous travel control means constituting part of the vehicle traffic control system as one embodiment of the present invention.
Figure 9:
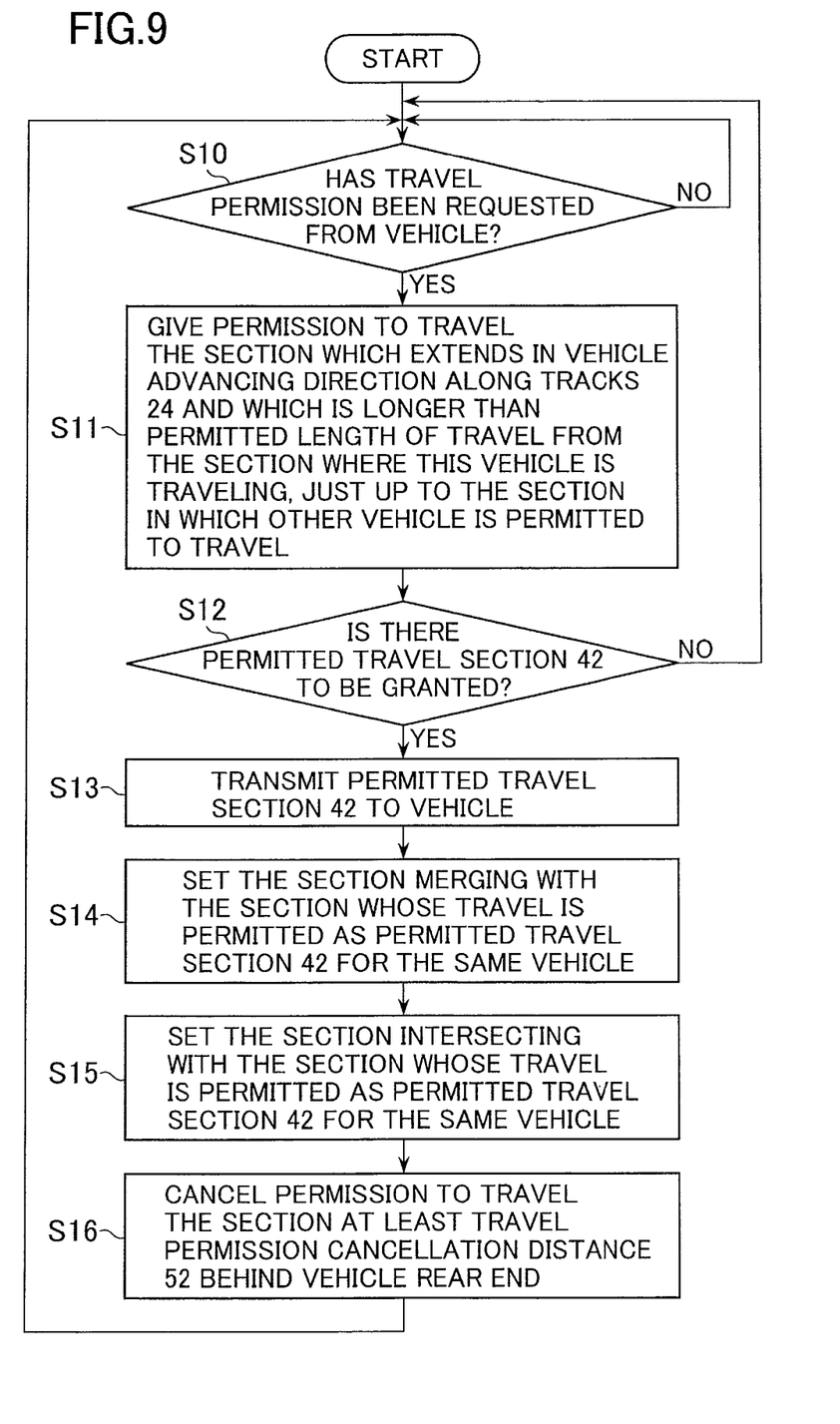
FIG. 9 is a flowchart showing details of a process performed by the traffic control means constituting part of the vehicle traffic control system as one embodiment of the present invention.

Explained now with the use of FIGS. 8 and 9 is a control process regarding the control station and the dump trucks in this embodiment. FIG. 8 is a flowchart showing details of a process performed by the autonomous travel control means constituting part of the vehicle traffic control system as one embodiment of the present invention. FIG. 9 is a flowchart showing details of a process performed by the traffic control means constituting part of the vehicle traffic control system as one embodiment of the present invention. In FIGS. 8 and 9, the same reference numerals as those in FIGS. 1 through 7 designate the same entities, and their detailed explanations are omitted.

FIG. 8 shows a flow of the process by the autonomous travel control means 9 in the onboard control apparatus ix mounted on the dump truck 1.

The autonomous travel control means 9 calculates the remaining permitted travel distance 43 on the basis of the current position of the dump truck 1 and of the current travel permission section 42 set in the map data 12 so as to determine whether the remaining permitted travel distance 43 is shorter than the travel permission request starting distance 44 (step S1). If the remaining permitted travel distance 43 is shorter than the travel permission request starting distance 44, step S2 is reached; otherwise, step S3 is reached.

The autonomous travel control means 9 transmits a travel permission request and current position information to the traffic control apparatus 2X of the control station 2 (step S2).

The autonomous travel control means 9 determines whether it has obtained travel permission from the traffic control apparatus 2X of the control station 2 (step S3). If the travel permission has been received, step S4 is reached; otherwise step S5 is reached.

Upon receiving travel permission from the traffic control apparatus 2X of the control station 2, the autonomous travel control means 9 sets a travel permission section in the map data 12 (step S4).

The autonomous travel control means 9 determines whether the remaining permitted travel distance 43 is shorter than the stoppable distance Lst (step S5). If the remaining permitted travel distance 43 is shorter than the stoppable distance Lst, step S6 is reached; otherwise step S7 is reached.

The autonomous travel control means 9 starts to decelerate so that the dump truck 1 can stop within the travel permission section 42 if the remaining permitted travel distance 43 is shorter than the stoppable distance Lst (step S6).

The autonomous travel control means 9 determines whether the distance 51 from the current position of the dump truck 1 to the end of the travel permission section already passed is longer than the travel permission cancellation distance 52 (step S7). If the distance 51 between the current position of the dump truck 1 and the end of the travel permission section already passed is longer than the travel permission cancellation distance 52, step S8 is reached; otherwise step S1 is reached.

The autonomous travel control means 9 cancels permission to travel the passed section in the map data 12 if the distance 51 to the end of the travel permission section already passed is longer than the travel permission cancellation distance 52 (step S8). Upon completing the process in step S8, the autonomous travel control means 9 goes to step S1, and repeats the subsequent steps discussed above.

FIG. 9 shows a flow of the process by the traffic control means 5 in the traffic control apparatus 2X installed in the control station 2.

The traffic control means 5 determines whether a travel permission has been requested from the onboard control apparatus 1X on the dump truck 1 (step S10). If it has, step S11 is reached; otherwise the process goes back to step S10.

Upon receiving the travel permission request from the onboard control apparatus 1X on the dump truck 1, the traffic control means 5 uses the received information on current position of the onboard control apparatus 1X on the dump truck 1, as well as information from the map data 6 in order to set, in the map data 6, permission to travel a section which extends in the advancing direction of the dump truck 1 and which is longer than the permitted length of travel 50 from the end of the section where the dump truck 1 is traveling, or permission to travel just up to the section in which other dump truck is permitted to travel (step S11).

The traffic control means 5 determines whether there is a travel permission section to be granted (step S12). Specifically, it is determined whether there is no section in which permission should be given to travel when, for example, other dump truck is given permission to travel the section adjacent to the section 24 in which the onboard control apparatus 1X on the dump truck 1 is currently traveling. If there is, step S13 is reached; otherwise the process goes back to step S10.

If there is a travel permission section to be granted, the traffic control means 5 sets that travel permission section 42 in the map data 6 and transmits simultaneously a message giving permission to travel the section in question to the onboard control apparatus 1X on the dump truck 1 (step S13).

The traffic control means 5, if there is a section merging with the section whose travel is permitted, sets the merging section in the map data 6 as the travel permission section 42 for the onboard control apparatus 1X on the same dump truck 1 (step S14).

The traffic control means 5, if there is a section intersecting with the section whose travel is permitted, sets the intersecting section in the map data 6 as the travel permission section 42 for the onboard control apparatus 1X on the same dump truck 1 (step S15).

If the distance from the current position of the onboard control apparatus 1X on the dump truck 1 to the end of the travel permission section already passed is longer than the travel permission cancellation distance 52, the traffic control means 5 cancels the permission to travel the section already passed in the map data 6 (step S16). Upon completing the process in step S16, the traffic control means 5 goes to step S10, and repeats the subsequent steps discussed above.

Figure 10:
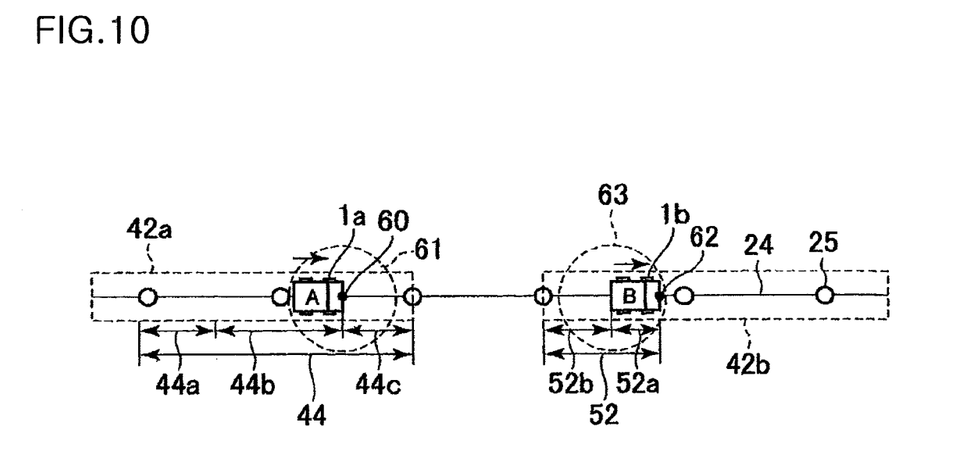
FIG. 10 is a conceptual diagram explaining a travel permission request starting distance and a travel permission cancellation distance for the vehicle traffic control system as one embodiment of the present invention.

Explained now with the use of FIG. 10 is how this embodiment deals with an error in the estimated self-position of the dump truck. FIG. 10 is a conceptual diagram explaining the travel permission request starting distance and travel permission cancellation distance for the vehicle traffic control system as one embodiment of the present invention. In FIG. 10, the same reference numerals as those in FIGS. 1 through 9 designate the same entities, and their detailed explanations are omitted.

Whereas the self-position of the onboard control apparatus 1X on the dump truck 1 is estimated with the use of GPS or the like, the position information identified by GPS contains an error. Also, there exist locations where GPS signals cannot be received over the transport roads 23 provided along the walls of the strip mine pit. In these locations, the positions that cannot be determined by GPS are estimated by interpolation on the basis of gyro usage and vehicle wheel revolutions, for example. This raises the possibility of larger error in the self-position estimation to be incurred.

When the error in the estimated self-position has become larger, the onboard control apparatus 1X on the dump truck 1 supposedly traveling inside the section whose travel is permitted may turn out to be traveling outside the permitted section. In order to deter such troubles attributable to the error, the travel permission request starting distance 44 and travel permission cancellation distance 52 are set as follows.

FIG. 10 shows settings regarding: the onboard control apparatus 1X on the dump trucks 1*a*, 1*b*; the tracks 24; and the travel permission sections 42*a*, 42*b*, as well as the travel permission request starting distance 44 and travel permission cancellation distance 52. In FIG. 10, the position of the onboard control apparatus 1X on the dump truck 1*a* is denoted by a vehicle front end 60, and a conceivable estimated self-position error is represented by a circle 61. Given these settings, the actual position of the vehicle front end may be assumed to be distributed within the range of the circle 61.

First, the travel permission request starting distance 44 is set as the sum of a first offset distance (Loff1) 44*a* established typically in consideration of the incidence of radio communication disruptions, a stoppable distance (Lst) 44*b* of the dump truck 1*a*, and a second offset distance (Loff2) 44*c* longer than the radius of the circle 61.

Next, a target stop distance of the dump truck 1*a* is set the second offset distance (Loff2) 44*c* short of the end of the travel permission section 42*a*. This setting prevents the onboard control apparatus 1X on the dump truck 1*a* from traveling out of the travel permission section 42*a* even when the estimated self-position value has an error.

Likewise, the position of the onboard control apparatus 1X on the dump truck 1*b* is expressed by a vehicle front end 62 of the truck, and the conceivable estimated self-position error is represented by a circle 63. Given these settings, the actual position of the vehicle rear end can be assumed to be distributed within the range of the circle 63.

Here, the travel permission cancellation distance 52 is set as the sum of a vehicle body length 52*a* of the dump truck 1*b* and a second offset distance 52*b* longer than the radius of the circle 63. This setting inhibits the onboard control apparatus 1X on the dump truck 1*b* from traveling out of the travel permission section 42*b* at the time of the presence of an error in the estimated self-position value even if permission to travel the nearest section short of the travel permission section 42*b* is canceled.

The structures described above allow the dump trucks 1*a*, 1*b* to travel within the travel permission sections 42*a*, 42*b* even when there is an error in the estimated self-position of the onboard control apparatus 1X on the dump trucks 1*a*, 1*b*. As a result, interference between the dump trucks can be averted.

An error in the vehicle width direction resulting from the estimated self-position of the onboard control apparatus 1X on the dump trucks 1*a*, 1*b* is corrected by the laser radar sensors 31, 32 (shown in FIG. 2) detecting the shoulders of the tracks.

Figure 11:
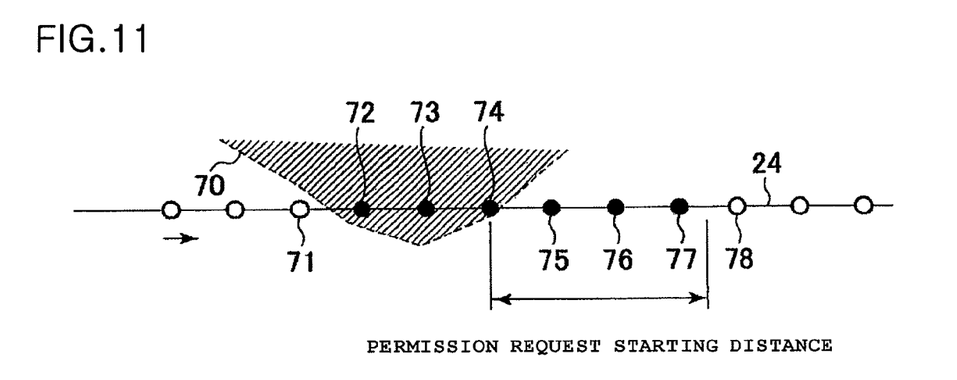
FIG. 11 is a conceptual diagram explaining adjustments of the travel permission section according to recorded communication conditions for the vehicle traffic control system as one embodiment of the present invention.

Explained now with the use of FIG. 11 is how this embodiment is configured to let the dump trucks travel in a more stable manner in the face of radio communication failures. FIG. 11 is a conceptual diagram explaining adjustments of the travel permission section according to recorded communication conditions for the vehicle traffic control system as one embodiment of the present invention. In FIG. 11, the same reference numerals as those in FIGS. 1 through 10 designate the same entities, and their detailed explanations are omitted.

As discussed above, at the site of the mine, the transport roads 23 and other paths are typically provided along the walls of a strip mine pit, so that radio communication may be temporarily disrupted due to the presence of the pit walls. Since these communication disruptions are topographically incurred, their incidence is often limited to particular locations. Thus before the operation of the autonomous dump trucks is started, a vehicle for measuring radio communication conditions may be operated so as to record the locations of poor radio communication conditions. The settings of the travel permission section 42 may then be adjusted to eliminate the need for radio communication where communication conditions are poor, whereby the incidence of communication failures can be reduced.

FIG. 11 shows the tracks 24, a location 70 where radio communication conditions are poor in the shadow of pit walls, and nodes 71 through 78. With reference to FIG. 11, it is recorded to the map data 6 in the traffic control apparatus 2X of the control station 2 that the radio communication conditions are poor for the nodes 72, 73, 74 included in the location 70 of poor radio communication conditions.

Upon granting the travel permission section 42 to the onboard control apparatus 1X on the dump truck 1, the traffic control means 5 in the traffic control apparatus 2X sets the travel permission section 42 in such a manner that none of the nodes 72, 73, 74 of poor radio communication conditions will become the end of the travel permission section 42 and that none of the nodes 75, 76, 77 which extend in the vehicle advancing direction and which are shorter than the travel permission request starting distance 44 will become the end of the travel permission section 42.

Where the travel permission section 42 is set in this manner, the travel permission request from the onboard control apparatus 1X on the dump truck 1 and radio communications of travel permission settings from the traffic control apparatus 2X of the control station 2 can be prevented from being generated in the sections with poor communication conditions. As a result, even at the site of a mine where there are obstructions to radio communication, the frequency that the dump truck 1 stops can be reduced, which contributes to a traffic control system capable of ensuring continuous vehicle travel to be provided.

Given the above-described structures, communication conditions may be measured and recorded typically by means of the following methods: (1) means for measuring radio communication conditions is installed in the onboard control apparatus 1X on the automated dump truck 1 so as to measure the radio communication conditions while the dump truck 1 is manned to travel along the tracks 24; (2) the communication conditions are recorded to the map data 12 in the onboard control apparatus 1X with regard to the nodes near the self-position identified by the dump truck 1; and (3) the records are transferred to the map data 6 in the traffic control apparatus 2X of the control station 2.

Alternatively, the above-mentioned radio communication conditions may be recorded continuously even while the automated dump trucks are in operation, so that the traffic control means 5 in the traffic control apparatus 2X will adjust the settings of the travel permission section 42 on the basis of the continuously updated records of the communication conditions.

Although this embodiment has been explained in terms of traffic control on the transport roads 23, this is not limitative of the present invention. For example, if the same processing is carried out within the areas of the excavation site 20 and soil dumping sites 21, 22, it will be possible to provide a traffic control system capable of averting interference between dump trucks in these areas.

REFERENCE NUMERALS

1 Vehicle (dump truck)
1X Onboard control apparatus
2 Control station
2X Traffic control apparatus
3 Radio communication means
4 Vehicle dispatch management means
5 Traffic control means
6 Map data
7 User interface
8 Server
9 Autonomous travel control means
10 Vehicle control apparatus
11 Onboard sensor
12 Map data
20 Excavation site
21 Soil dumping site
22 The other soil dumping site
23 Transport road
24 Track
25 Node
26 Intersection
40 Destination
41 Route
42 Permitted travel section
43 Remaining permitted travel distance
44 Travel permission request starting distance
50 Permitted length of travel
51 Distance between vehicle and end of section
52 Travel permission cancellation distance

The invention claimed is:

1. A vehicle traffic control system comprising:
an onboard control apparatus mounted on each of a plurality of vehicles;
a control station which controls the vehicles traveling;
a traffic control apparatus which is installed in the control station, which divides a track for the vehicles into a plurality of sections, and which performs a blocking control to assign a non-overlapping travelable section to the vehicles as a permitted travel section; and
communication means for allowing communication between the traffic control apparatus and the onboard control apparatus mounted on the vehicles, wherein
the onboard control apparatus sets a travel permission request starting distance as a distance longer than a stoppable distance on a basis of current speed of an own vehicle, and
the onboard control apparatus transmits repeatedly a travel permission request and current position information on the own vehicle to the traffic control apparatus until a next travel permission is obtained when remaining length of the permitted travel section has become shorter than the travel permission request starting distance in an advancing direction of the own vehicle.

2. A vehicle traffic control system according to claim 1, wherein the traffic control apparatus receives the current position information on the own vehicle and the travel permission request transmitted from the onboard control apparatus, and calculates the next permitted travel section assigned to the onboard control apparatus.

3. A vehicle traffic control system according to claim 2, wherein the onboard control apparatus sets the travel permission request starting distance as at least a sum of the stoppable distance of the own vehicle and an error in determining a self-position of the own vehicle, and further sets travel permission cancellation distance at least longer than the error in determining a self-position of the own vehicle; and the traffic control apparatus cancels travel permission for the permitted travel section when the distance from the end of the permitted travel section passed by the own vehicle to the current position of the own vehicle has become longer than the travel permission cancellation distance.

4. A vehicle traffic control system according to claim 2, wherein if there is a track section merging with the permitted travel section granted to the own vehicle, the traffic control apparatus sets the track section as the permitted travel section to be granted to the own vehicle, and if there is another track section intersecting with the permitted travel section granted to the own vehicle, the traffic control apparatus further sets another track section as the permitted travel section to be granted to the own vehicle.

* * * * *